March 24, 1970  B. B. GILMORE, JR  3,502,390
DENTAL STEREOSCOPE

Filed March 13, 1967  2 Sheets-Sheet 1

INVENTOR.
BURDETTE B. GILMORE, JR.
BY
ATTORNEY

March 24, 1970     B. B. GILMORE, JR     3,502,390
DENTAL STEREOSCOPE

Filed March 13, 1967     2 Sheets-Sheet 2

INVENTOR.
BURDETTE B. GILMORE, JR.
BY
ATTORNEY

United States Patent Office 3,502,390
Patented Mar. 24, 1970

3,502,390
DENTAL STEREOSCOPE
Burdette B. Gilmore, Jr., 10511 E. Mary Katherine Drive, Scottsdale, Ariz. 85251
Filed Mar. 13, 1967, Ser. No. 622,783
Int. Cl. G02b 27/22
U.S. Cl. 350—133      6 Claims

ABSTRACT OF THE DISCLOSURE

A stereoscope for viewing a pair of dental X-ray frames picturing the same area taken from a pair of angles so as to provide a stereoscopic pair of frames. The stereoscope has adjustable X-ray frame holders adapted for binocular visual adjustment of the frame.

BACKGROUND OF THE INVENTION

This invention relates to optical equipment.

More particularly, the invention concerns a stereoscope for viewing dental X-ray frames.

In a further aspect, the invention concerns a stereoscope for viewing dental X-ray frames taken so as to provide a stereoscopic pair of frames.

In a still further aspect, the invention concerns stereoscope of the above type in which the X-ray frames are expediently inserted or removed and readily and conveniently adjusted for binocular visual alignment.

Yet in a still further aspect the invention concerns a stereoscope which is highly durable, relatively inexpensive to manufacture, and particularly lightweight, compact and portable.

The sensation of depth in an object, usually referred to as three-dimensional viewing, is due to binocular vision. Binocular vision is the ability of the two eyes to perceive dissimilar views of the same object. The views are dissimilar in two significant respects, the angle of vision and in light distribution. By rapid comparision and combination of both views, the brain is able to perceive depth and interpret the retinal images in the resulting sensation of geometrical solidity.

Normally, in stereoscopic photography, the photographer takes two pictures which simulate the normal human binocular vision. When these pictures are seen through a special viewer, called a stereoscope, the brain reacts to these views as it would to the object itself and therefore "sees" a three-dimensional image.

The use of X-ray photography is well-known in the medical profession. A single X-ray frame does not reveal to the practitioner the exact depth or positioning of the internal area of interest. Recently, however, there have been significant developments in the field of stereoscopic X-ray photography.

To provide a pair of stereoscopic frames, particularly in the field of dentistry, doctors employ a method known as the Clark technique. With this technique, two sequential X-rays are taken at slightly different angles to simulate normal binocular vision. Through simultaneous inspection of the X-ray frames so taken, the dentist is more able to gauge the depth of abscess or relationship between nerve, bone, and tooth structure. Interpretation in this manner of the results of X-ray frames taken according to the Clark technique is exceedingly difficult. Even among dentists thoroughly knowledgeable in the technique, the interpretation of the data is largely a matter of personal judgment.

It would be highly advantageous, therefore, to provide a viewer to assist in the more accurate interpretation of X-rays taken by the Clark technique.

SUMMARY OF THE INVENTION

Accordingly, it is a principal object of the present invention to provide a stereoscope for viewing a stereoscopic pair of dental X-ray frames.

Another object of the present invention is the provision of a stereoscope in which the X-ray frames may be readily interchanged and expediently positioned for binocular visual adjustment.

Still another object of the present invention is to provide a stereoscope which is relatively inexpensive to manufacture and is lightweight and compact and highly portable.

Yet still another object of the present invention is to provide a stereoscope in which the X-ray frames may be viewed while still wet, the stereoscope being constructed to provide for convenient periodic cleaning and being constructed of a material inert to X-ray developing chemicals.

These and other further and more specific objects and advantages of the present invention will become readily apparent to those skilled in the art from the detailed description of the presently preferred embodiment thereof.

To obtain the desired objectives of my present invention according to a presently preferred embodiment thereof, I first provide a substantially rectangular case having elongate base, top, and side panels. The base panel extends rearwardly beyond the limits of the case. A translucent panel extends vertically upward along the rear lateral edge of the base panel. A vertical divider abuts the translucent panel and extends longitudinally between the top and bottom panels parallel to the side panels and terminates a relatively short distance from the front of the case. A double prismatic lens having a continuous vertical front surface is housed within the front of the case and centrally abuts the vertical divider such that each lens may service its respective side of the divided case. A ferro-magnetic impregnated plastic strip, magnetic in nature, extends vertically along the inside outboard edge of the rear translucent panel.

A pair of X-ray frames are prepared according to the Clark technique. Specifically, two pictures are taken of the same area so as to provide a stereoscopic pair. A small metallic clip is used to grip the edge of each picture. The clips are then magnetically retained against the ferro-magnetic impregnated plastic strip. This arrangement allows for expedient adjustment of the X-ray frames when inserted into the stereoscope.

The viewer now peers through the double prismatic lens to view the dental X-ray frames. If relative care was exercised in the preparation of the X-ray frames, minor adjustment of either of the X-ray frames will produce the sensation of depth and therefore present a three-dimensional image. The optical phenomena herein involved are commonly referred to as geometric optics. The center-to-center distance of the double prism is approximately 2⅜ inches to accommodate the normal distance between the viewer's eyes. The focal distance provided by the stereoscope is approximately 8 inches. The vertical divider assures that there are presented two mutually exclusive views, one to each eye. By rapid comparison and combination of both views, the brain is able to perceive the sensation of depth.

It will be obvious to those skilled in the art that the only desired light is that transmitted through the rear translucent panel and the detachably secured X-ray frames. The case, therefore, is opaque to inhibit transmission of extraneous light sources. The interior surfaces of the case are burnished or otherwise treated as by sand blasting so as to provide a light diffuse surface to retard reflection and confusing images.

BRIEF DESCRIPTION OF THE DRAWINGS

A more thorough understanding of the present invention will become readily apparent to those skilled in the art from the following detailed description of a presently preferred embodiment thereof taken in conjunction with the drawings in which.

DESCRIPTION OF THE PREFERRED EMBODIMENT

Figure 1:
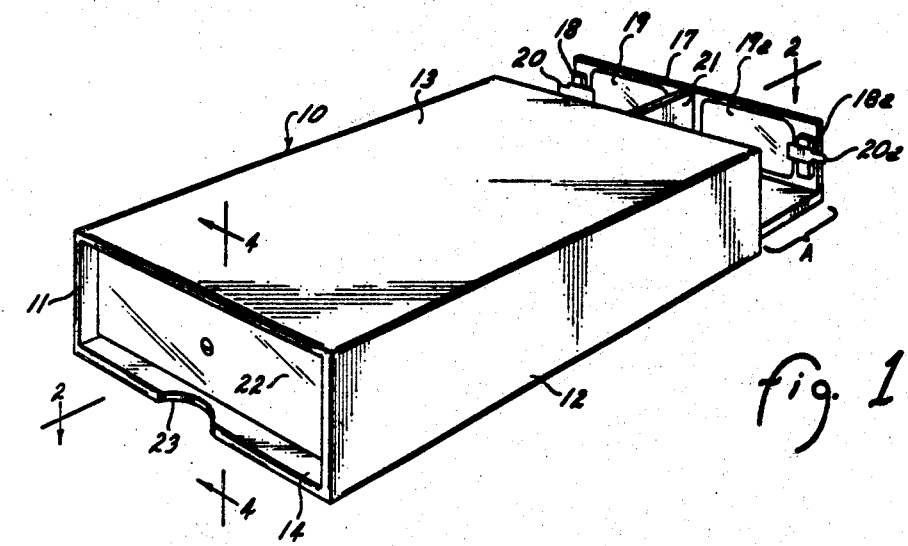
FIGURE 1 is a perspective view of a stereoscope constructed in accordance with the teachings of the present invention chosen for purposes of illustrating a presently preferred embodiment thereof when ready for use.

Turning now to the drawings in which the same reference numeral indicate corresponding elements throughout the several views, attention is first directed to FIGURE 1 which shows the stereoscope case generally designated by the reference character 10 having side panels 11 and 12, a top panel 13, and a base panel 14. The base panel 14 extends rearwardly of the case as shown by the area A. A translucent panel 17 extends vertically upward along the rear lateral edge of the base panel 14. A pair of ferro-magnetic impregnated plastic strips 18 and 18A are glued or otherwise secured along the inside of either outboard edge of the translucent panel 17. A pair of dental X-ray frames 19 and 19A as hereinbefore described are each gripped along one vertical edge by one of a pair of metallic clips 20 and 20A. The clips 20 and 20A are magnetically retained against the strips 18 and 18A. The thicknesses provided for the plastic strips 18 and 18A and the clips 20 and 20A are such as to provide approximately a ⅛ inch clearance between the X-ray frames when held in place in the stereoscope and the surface of the translucent panel 17. This clearance prevents sticking of the normally wet X-ray frames 19 and 19A to the translucent panel 17. A vertical divider 21 abuts the rear translucent panel 17 and extends longitudinally between the top panel 13 and the base panel 14 substantially the length of the case 10. A prism assembly 22, as will be hereinafter described in greater detail, is housed within the front of the case 10 and abuts the vertical divider 21. A semi-circular recess 23 located centrally along the forward edge of the base panel 14 provides clearance for the viewer's nose.

Figure 2:
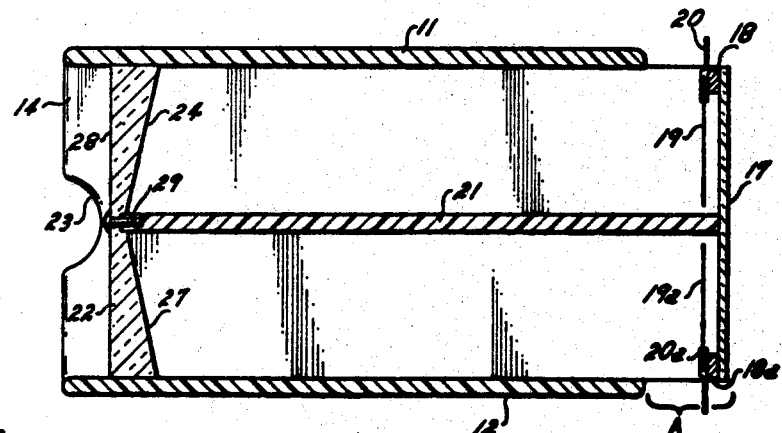
FIGURE 2 is a plan view in section taken along the line 2—2 of FIGURE 1 and showing the internal optical separation.

Turning now to FIGURE 2, the optical arrangement of the stereoscope is particularly noted. The prism assembly 22 comprises a pair of mutually joined prisms 24 and 27 having a single plane vertical front surface 28. A threaded fastener 29 extends through the prism assembly 22 and threadedly engages the divider 21 to retain the prism assembly. It will be immediately apparent to those skilled in the art that the prisms 24 and 27 direct either eye at the appropriate X-ray frames 19 and 19A while the divider 21 insures that each eye perceives a mutually exclusive view.

Figure 3:
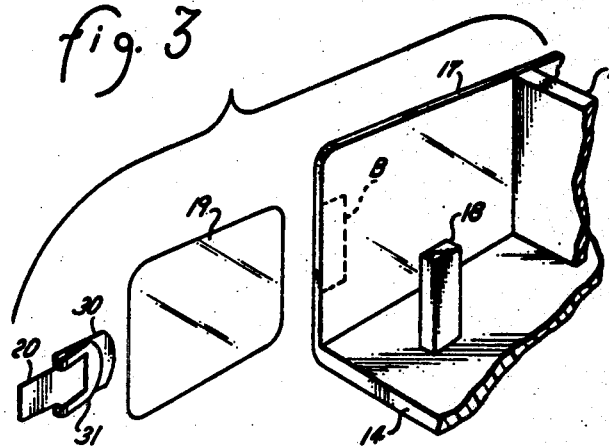
FIGURE 3 is an exploded partial perspective view specifically detailing the X-ray frame position elements.

FIGURE 3 further details the detachable securement and adjustable positioning of the X-ray frame. The ferro-magnetic impregnated plastic strip 18 is secured to the area indicated by the dashed rectangle B. The spring metal clip 20, similar to a common bookkeeping index tab, is bent as to have a pair of spring jaws 30 and 31. One edge of the X-ray frame 19 is inserted between the jaws 30 and 31. The substantially flat backside of the clip 20 is magnetically retained against the strip 18. The clip 20 may be readily moved about on the surface of the strip 18 to accommodate positioning of the X-ray frame 19.

Figure 4:
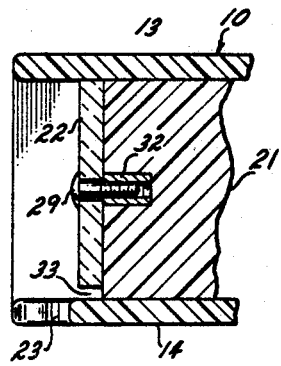
FIGURE 4 is a partial elevational view taken along the line 4—4 of FIGURE 1 and showing a preferred lens arrangement.

Attention is now directed to FIGURE 4 which particularly shows the removability of the prism assembly 22. A threaded insert 32 in imbedded in the vertical divider 21. A threaded fastener 29, preferably a machine screw, extends through the prism assembly 22 and engages its threads in the insert 32. The threaded insert 32 assures increased thread life as opposed to engaging the fastener 29 directly into the divider 21. It is herein noted that the prism assembly 22 terminates above the bottom panel 14 leaving an opening 33 through which liquid from the still-wet X-rays may pass rather than accumulate upon the interior surface of the prism assembly.

Figure 5:
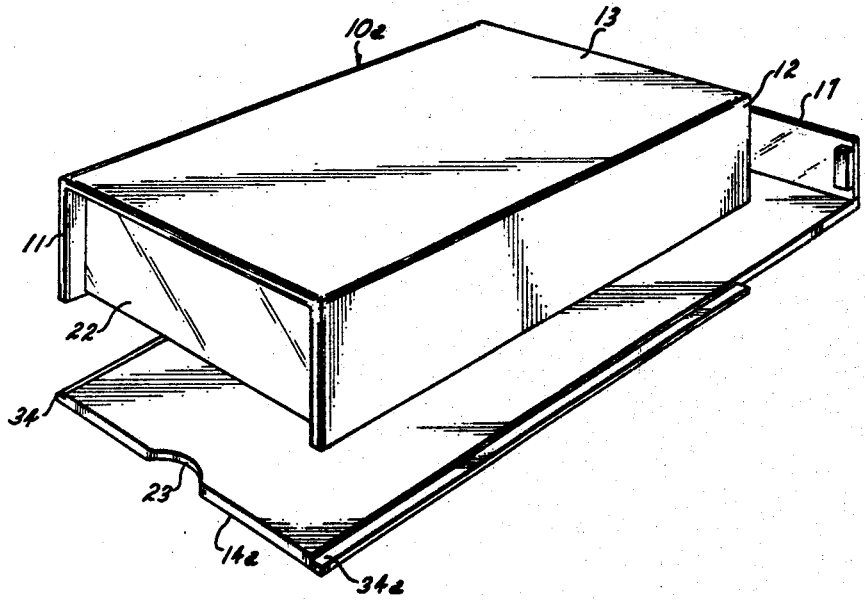
FIGURE 5 is an exploded perspective view illustrating an alternately preferred case arrangement.

FIGURE 5 illustrates an alternately preferred method of constructing the stereoscope according to the teachings of the present invention. The alternate case 10A has permanently attached top 13, side panels 11 and 12, and prism assembly 22, each being similar to those described in connection with FIGURE 1. The translucent panel 17 and the vertical divider 21 are carried by an alternate base panel 14A. A pair of rabbets 34 and 34A extend longitudinally along either side of the base panel 14A. The lower edge of either of the side panels 11 and 12 frictionally engage within the respective rabbets 34 and 34A for detachable securement of the case 10A. Expedient detachment of the base panel 14A from the case 10A provides access for convenient cleaning of the internal surfaces of the stereoscope.

Figure 6:
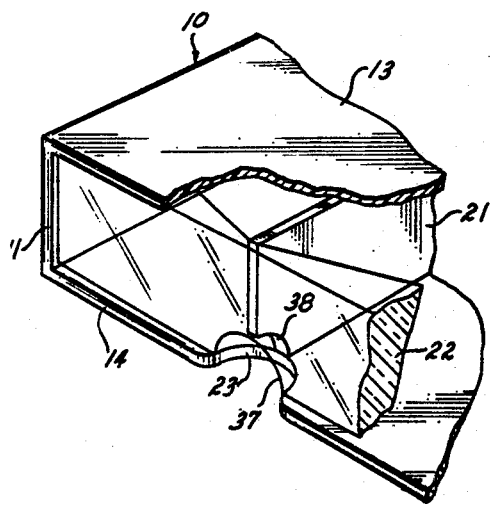
FIGURE 6 is a partial perspective view illustrating an alternately preferred prism arrangement.

FIGURE 6 illustrates a varied method of insertion of the prism assembly in the device of FIGURE 1. As illustrated here, a prism assembly is moved substantially forward approximately the front edge of the case 10. The prism assembly 22 is frictionally retained by the top panel 13, the bottom panel 14 and the side panels 11 and 12. A semi-circular recess 37 in the prism assembly 22 and a complementary recess 38 in the vertical divider 21 supplement the indentation 23 in the base panel 14 to accommodate the viewer's nose.

Having fully described and disclosed the invention in such clear and precise terms as to enable those skilled in the art to understand and practice the same, I claim:

1. A stereoscope especially adapted for viewing dental X-ray frames and further adapted for binocular visual adjustment of such frames, said stereoscope comprising:
    (a) a case having substantially rectangular base, side, and top panels, said base panel extending beyond side case at the rear thereof;
    (b) a translucent panel extending vertically upward along the rear lateral edge of the base panel;
    (c) a vertical divider abutting said translucent panel and extending longitudinally between said top and bottom panels substantially the length of said case;
    (d) a pair of prisms housed proximate the front of said base, one of each said prisms positioned either side of said vertical divider; and
    (e) means for detachably positioning a pair of X-ray frames between the rear of said case and said translucent panel, one of each said frames located either side of said vertical divider, said means being positionally adjustable in such manner that each said frame is individually movable in any direction in the plane of said frame, said detachably positioning means comprising a plastic strip attached to said translucent panel and a spring clip detachably held by said strip to grip a portion of said X-ray frame, said clip being adapted to be retained against said plastic strip.

2. The stereoscope of claim 1 wherein an opening is defined by the lower edge of said prism, the side panels and the bottom panel of said case.

3. The stereoscope of claim 1 wherein said pair of prisms comprises:
(a) a continuous vertical planar surface proximate the front of said case;
(b) a pair of parallel side surfaces extending rearward of said case along said side panels;
(c) a pair of vertical single plane surfaces extending inwardly from the rear edge of each said side surface toward said continuous vertical front surface;
(d) an elongate surface parallel to said front surface truncating the apex of said inwardly extending vertical rear surafces, said surface abutting the front end of said vertical divider;
(e) means for securing said prisms to said case.

4. The stereoscope of claim 3 wherein said means for securing said prism to said case includes a threaded fastener extending through said front surface and said elongate surface and threadedly engaging said vertical divider.

5. The stereoscope of claim 3 wherein said means for securing said prisms to said case includes frictional engagement of said prisms within said case.

6. The stereoscope of claim 1 wherein said means for detachably positioning said pair of X-ray frames includes means for holding said pair of X-ray frames at least approximately ⅛ inch from contact with said translucent panel.

References Cited

UNITED STATES PATENTS

| | | |
|---|---|---|
| 749,046 | 1/1904 | Folmer et al _____ 350—133 |
| 810,401 | 1/1906 | Fenn _____ 350—142 |
| 1,624,741 | 4/1927 | Leppke et al. |
| 2,297,322 | 9/1942 | Rasco _____ 350—144 |
| 2,693,370 | 11/1954 | Wheatley. |
| 2,768,554 | 10/1956 | Leslie _____ 350—140 |
| 2,919,509 | 1/1960 | Strandrers _____ 350—140 |

PAUL R. GILLIAM, Primary Examiner

U.S. Cl. X.R.

350—142, 143